United States Patent [19]

Slysh

[11] 3,772,876

[45] Nov. 20, 1973

[54] RECIPROCATING THERMAL ENGINE

[75] Inventor: Paul Slysh, San Diego, Calif.

[73] Assignee: General Dynamics Corporation, San Diego, Calif.

[22] Filed: May 24, 1971

[21] Appl. No.: 146,344

[52] U.S. Cl. .................................................. 60/529
[51] Int. Cl. ............................................ F03g 7/06
[58] Field of Search ........................ 60/23; 236/101; 73/362.1, 362.2, 363, 363.5

[56] References Cited
UNITED STATES PATENTS

| 3,152,554 | 10/1964 | Kofink | 60/23 X |
| 3,339,077 | 8/1967 | Shapiro | 60/23 X |

FOREIGN PATENTS OR APPLICATIONS

| 1,094,989 | 5/1965 | France | 236/101 |

Primary Examiner—Alan Cohan
Assistant Examiner—Allen M. Ostrager
Attorney—John R. Duncan

[57] ABSTRACT

A reciprocating thermal engine which converts heat energy into rotational mechanical motion by expansion and contraction of bimetallic elements. The bimetallic elements are cantilevered between a hot plate and a cold plate, and the bimetallic elements reciprocate due to alternate heating and cooling. This reciprocating motion is converted to rotational motion by means of cam followers acting on cam surfaces.

11 Claims, 17 Drawing Figures

FIG. 1

HEAT

RECIPROCATING THERMAL ENGINE

BACKGROUND OF THE INVENTION

An engine is generally described as a machine which performs mechanical work by burning or otherwise consuming a fuel. Traditionally, engines are classified as external or internal combustion. External combustion engines consume their fuel in a separate furnace or reactor, wherein chemical or nuclear energy is converted to thermal energy, and the engine proper converts the thermal energy into mechanical work. In most instances a working fluid, such as steam, hot air, water, liquid metal, or fluorinated hydrocarbons, takes on energy in the form of heat and gives up the energy in the engine, the engine proper being a thermodynamic device.

Another traditional basis for classification concerns the working fluid of the engine. If the working fluid is recirculated, the engine operates in a closed cycle, whereas if the working fluid is discharged after one pass through the engine, the engine operates on an open cycle. Usually the open cycle engine is simpler and less expensive, the commonest types using air as the principal constituent of the working fluid as well as the oxidizer of the fuel. Such engines are the common reciprocating gasoline and diesel engines. Incomplete combustion in these type of engines cause discharge into the atmosphere of harmful waste products, whereas closed cycle engines usually avoid the discharge of as many harmful waste products.

Most of todays engines consume fossil fuels — coal, gasoline, fuel oil, and natural gas — since they produce ample heat at a low price, however the by products of our continually increasing rate of burning fossil fuels are poluting our atmosphere at an alarming rate. Additionally, the waste heat from many of our stationary engine installations are thermally polluting our streams.

Thus, it appears that closed cycle engines using conventional fuels significantly reduce atmospheric pollution for the interim and are more adaptable to conversion to solar or nuclear furnace sources of heat when these become economically feasible.

Today the most widely used closed cycle engines utilize vapor or steam to drive a turbine. Steam or vapor leaves the boiler and adiabatically expands through the engine, whereafter it is condensed to a liquid and pumped back to the boiler for reheating. Turbines may also be driven by gas, but today most of these engines are open cycle, wherein air is compressed and mixed with a fuel which is burned and thereafter expanded through the turbine and exhausted to the atmosphere. However, the gas-turbine engine can be a closed cycle type by transferring heat to the air across a high temperature reservoir or heat exchanger which is connected by a closed circuit to the furnace or boiler, wherein additionally the air may be recirculated within the system if desired. Both the vapor or steam turbine and the gas-turbine engine are most adaptable to large systems since, inherently, rotating turbine equipment can be made most efficient in large scale.

An engine which derives its heat energy from the sun by solar radiation to a working fluid can be considered an external combustion engine, and by extension an engine heated directly by solar, nuclear, or fossil energy, external to the engine but without the use of a working fluid, could be considered an external combustion engine. Few of these type of engines are in commercial use today, although up to seventy years ago many attempts at converting solar energy to mechanical work were attempted using water and air as the working fluid, since they were so readily available.

In recent years a renewed interest in solar energy has developed because of the requirements for special applications of solar energy to space flight vehicles. The usefulness and life of todays space vehicles, which are miniturizations of the earth problem, are directly related to the amount of energy available. The use of systems which use internally stored chemical energy sources implies limited life, whereas solar and nuclear power appear to offer distinct advantages.

The direct conversion of heat energy into mechanical energy has seldom utilized the thermal expansion properties of solids. This principal has been utilized primarily for heat measuring, heat compensation, and heat control devices, wherein a solid composite material, usually in the form of sheet or strip, comprising two or more solid materials which, by virtue of the differing thermal expansion rates of the components, tends to alter its curvature when its temperature is changed. The composite material used in these thermal devices is commonly described as bimetal, although approximately half of the types manufactured today are actually made of three and four metal laminations. This change in curvature of bimetallic elements as a function of temperature is well known, having been suggested as early as 1766 for temperature compensation of chronometers. The early bimetallic elements were made of brass and iron, however in 1897 Guillaume and Dumas disclosed an alloy, now known as Invar, which is generally accepted as the forerunner of today's bimetals. The use of bimetallic elements to convert heat energy into mechanical deflection has been generally confined to heat sensors for control and measurement and are most commonly used in devices such as thermostats, electrical circuit-breakers, temperature gages and temperature compensation elements for instruments and time pieces. Bimetals have had very little useage as torque and work producing devices, although limited applications have been proposed for stepped-rotation devices utilizing pawls and ratchets, whereby the mechanical output so produced was of very low torque and not intended for producing substantial power, being used primarily for timers and sequencers.

An application of bimetallic element for generating power is taught by Shapiro in U. S. Pat. No. 3,366,865 wherein a bimetallic element is subjected alternately to a heating and cooling source, and electrical power is derived by magnetic induction from the reciprocating movement of a magnet within a coil, producing impulses of alternating polarity at irregular intervals. In accordance with the teachings, the impulses are supplied to a storage means such as a capacitor or by means of a rectifier to a storage battery. In another embodiment the intermittent mechanical motion produces a step-by-step rotational winding of a mechanical spring which in turn produces continuous rotation of an electrical generator through an escapement device.

Helical bimetal coils have been proposed for use in space vehicles to power sun-tracking systems. The device comprises a bimetal coil wound in the form of a helix, having one end fixed to the vehicle and the other end attached to a rotatable solar array, such that upon solar illumination the coil temperature increases, torque stresses are generated, and the free end of the coil rotates the array. A small shade attached to the solar array shades the coil when the array is in the desired alignment, and thus provides a feedback system which causes the bimetal coil to drive the solar array whenever the coil is illuminated by the sun. Normally the array must be driven through 360° of rotation during each orbit of the vehicle around a planet, and since the helical coil cannot provide continuous rotation, the coil must heat and cool in cycles transferring motion through a ratchet device to provide periodic, but continuing, rotation to the solar array. Here again the motion is intermittent, the device employing ratchets and pawls to convert the movement, and the output is of low torque and not intended to produce substantial power.

Thus, there remains a need for an improved machine which will directly convert heat energy into appreciable continuous mechanical power simply and economically without the complications of ratchets and pawls, or mechanical or electrical storage means to thereby convert intermittent mechanical motion into a continuous source of power.

SUMMARY OF THE INVENTION

It is, therefore, an object of this invention to provide an engine overcoming the above-noted problems.

Another object of this invention is to provide a means for extracting work from wasted heat now dumped into the atmosphere or lakes and streams as an unwanted by product of present manufacturing and power generation processes.

Another object of this invention is to provide a machine for the conversion of heat energy into useful mechanical energy, utilizing the thermal expansion properties of solid materials, the principal characteristic being its capacity to deliver appreciable continuous mechanical power, as contrasted to mechanisms such as thermostats and circuit breakers whose significant output is low-energy motion.

Another object of this invention is to provide an engine capable of utilizing nuclear or solar heat energy sources when substituted for fossil fuel energy sources without major modification to the engine.

Another object of this invention is to convert either radiated convective or conducted heat energy to mechanical power without major modification to the engine.

Another object of this invention is to directly convert heat energy into continuous mechanical power utilizing a simplified machine without the complications of mechanical or electrical storage means for converting intermittent power into continuous power.

A further object of the present invention is to provide reliable power at reasonable cost at remote areas having limited power sources available.

The above objects, and others, are accomplished by the present invention utilizing a new and novel conversion of the bending movement of bimetallic members, when expanding and contracting, into rotational movement by means of cam followers acting on cam surfaces in a programmed sequence. A continuous rotational output is produced by a plurality of bimetallic cantilevers, segment-shaped and so disposed to form a circular plane. The bimetallic cantilevers are supported between two plates, each containing a plurality of heat sinks, one plate and its associated heat sinks functioning to heat the bemetallic cantilevers and the other to cool the cantilevers. As the cantilevers reciprocate alternately from the hot side of the engine to the cold side and then back to the hot side, the cyclic expansion and contraction of each cantilever, in a programmed sequence, contributes its share of work to the energy conversion process, resulting in a substantial and continuous torque output.

BRIEF DESCRIPTION OF THE DRAWINGS

The advantages of the present invention, which will subsequently become apparent, reside in the construction and operation as hereinafter described, reference being made to the accompanying drawings, which show certain preferred embodiments of the invention, and forming a part hereof, wherein.

DETAILED DESCRIPTION OF THE INVENTION

Figure 1:
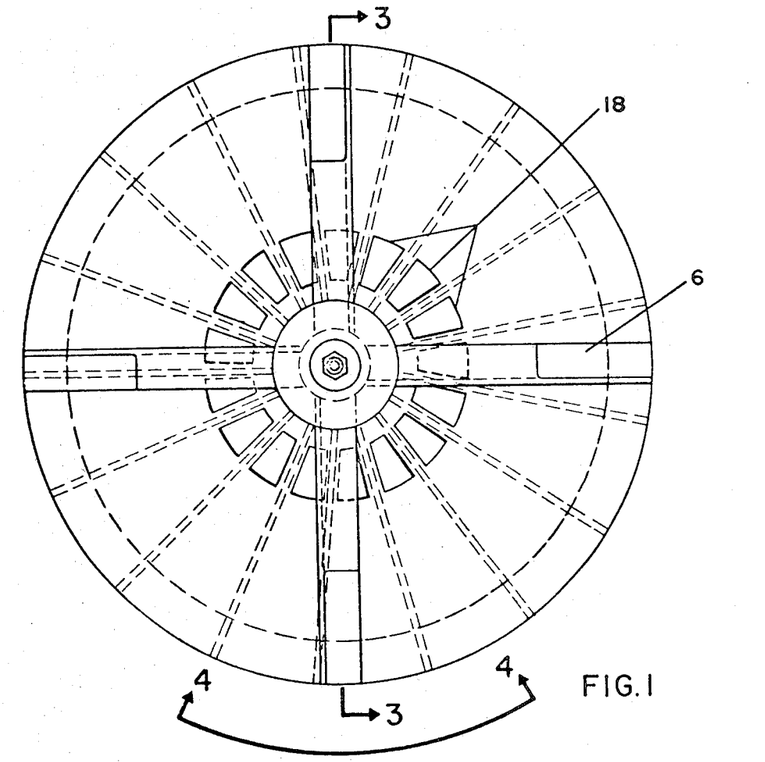
FIG. 1 is a plan view of the overall thermal engine, looking at the cold side of the engine.
Figure 2:
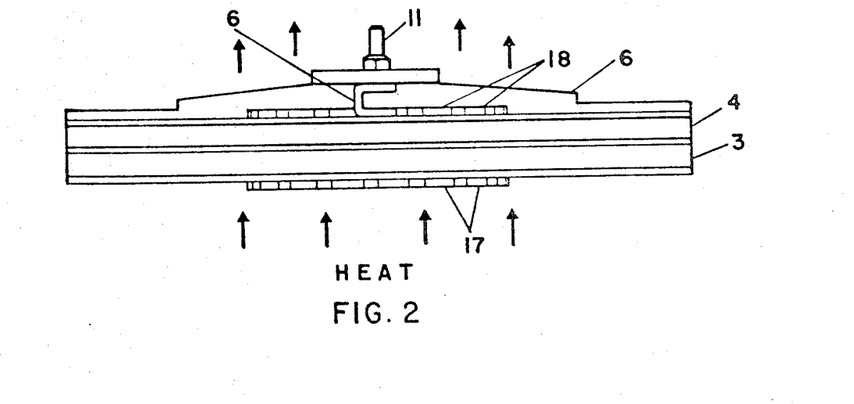
FIG. 2 is an elevation view of the overall thermal engine associated with FIG. 1.
Figure 3:
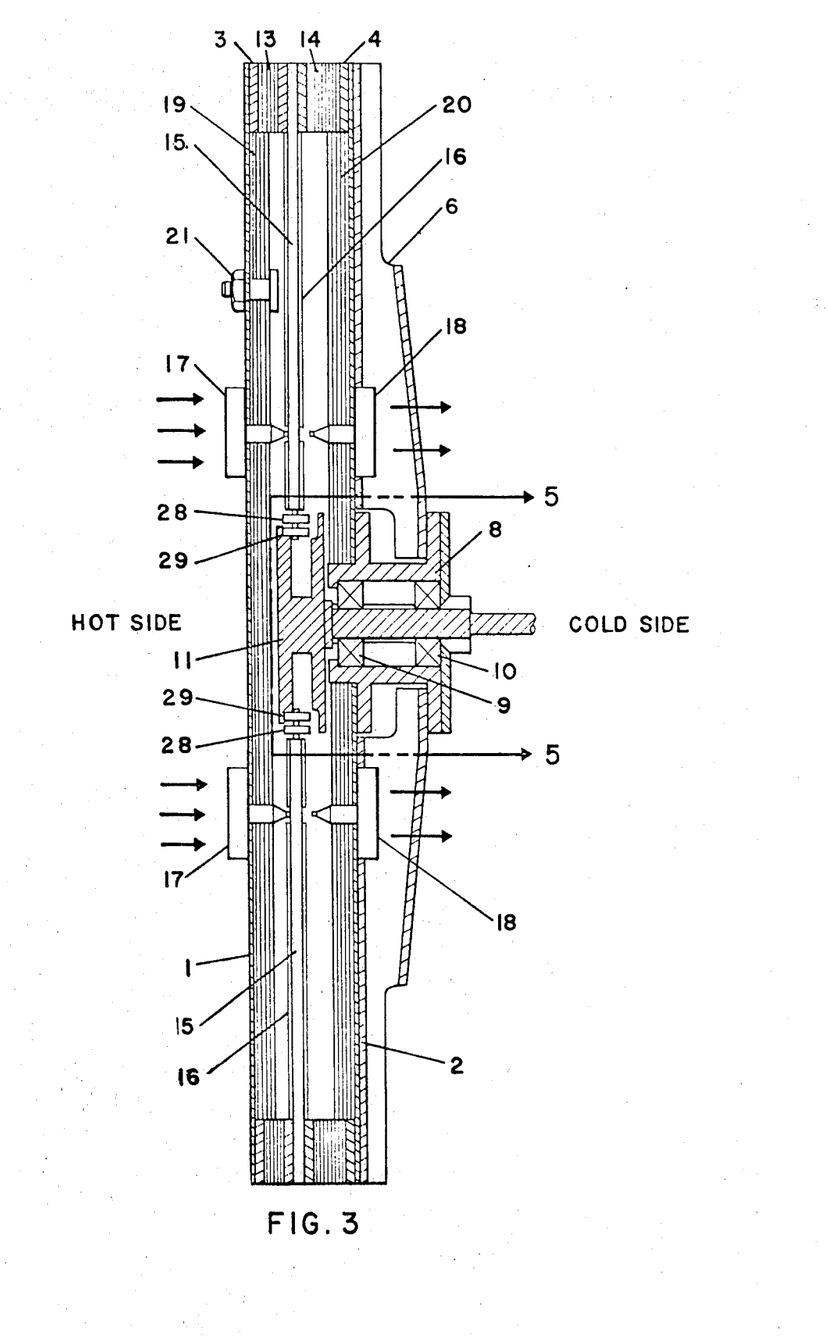
FIG. 3 is a sectional view taken substantially through a plane indicated by section-line 3—3 of FIG. 1.

Referring now to the drawings in detail, FIG. 1 illustrates a plan view of the thermal engine as viewed when looking at the cold side of the engine, it being observed from FIGS. 2 and 3 that there is a hot side 1 and a cold side 2 of the engine, and that the heat flow direction is shown by arrows. The source of heat energy may be from the sun or any other source which will radiate heat or conduct heat to the hot side of the engine, it being understood that any heat source may be utilized wherein heat energy is continuously supplied to and removed from the engine, and that many configurations may be devised for this purpose. In the embodiment illustrated, by way of example only, the sun is the heat source.

As shown in FIG. 3, the external structure of the engine comprises a hot-side plate 1, a cold-side plate 2, separated by insulation standoff rings 3 and 4, and a cruciform main support structure 6 structurally attached, such as by welding, to the cold-side plate 2, and supporting the center collar 8, containing bearings 9 and 10. Rotationally mounted in bearings 9 and 10 is spindle 11 which rotates relative to the engine structure and is the means for providing the rotational output torque of the engine.

Figure 4:
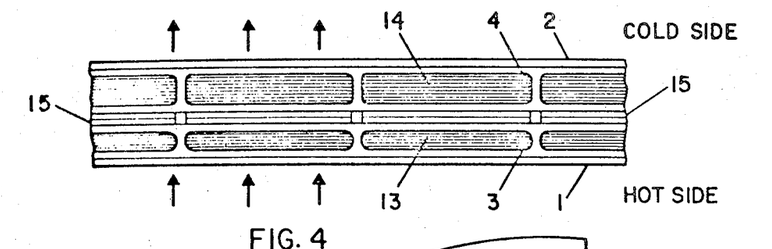
FIG. 4 is an elevation view illustrating a portion of the thermal engine taken substantially from a plane indicated by line 4—4 of FIG. 1.

In FIGS. 3 and 4 it will be observed that both the hot-side insulation standoff ring 3 and the cold-side insulation standoff ring 4 are preferably hollowed out in such a manner that only radial webs remain to give structural stiffness and reduce the conductive heat transfer path from the hot-side plate 1 to the cold-side plate 2. The hollow portions of insulation standoff ring 3 are filled with insulation plugs 13, and standoff ring 4 is filled with insulation plugs 14, as best seen in FIG. 4. In order to further minimize the heat losses through standoff rings 3 and 4 these rings are made of a low thermal conductive material such as one of the synthetic resins. Bimetallic cantilevers 15 are sandwiched between the insulation standoff rings 3 and 4 and thereby are centrally disposed between the hot-side plate 1 and the cold-side plate 2. The bimetallic cantilevers 15 are biased towards the hot-side plate 1. Each bimetallic cantilever is covered by insulation laminate 16 over the entire surface except for small apertures which permit intimate contact of the bimetallic cantilevers 15 with hot-side heat sinks 17 and cold-side heat sinks 18. Additional insulation of the bimetallic cantilevers 15 is provided by hot-side insulation blanket 19 and cold-side insultion blanket 20 attached to their respective plates 1 and 2 by means of attachments 21.

Thus it can be seen that all heat transfer paths to the bimetallic cantilevers 15 have been minimized except for the areas of contact with heat sinks 17 and 18. The contact area of each heat sink is small, sizing being a compromise between the requirements for a large area to accommodate quick conductive heat transfer to the cantilever 15 during contact, and a small area to minimize radiant heat transfer when the cantilever is disposed away from the respective heat sinks 17 and 18. In the unheated condition the cantilevers 15 are in contact with the hot-side heat sinks 17, and when sufficiently heated to overcome the hot-side bias they break away and travel toward the cold side of the engine where, after a period of contact with the cold-side heat sinks 18, they are sufficiently cooled to cause the hot-side biasing force to again drive the cantilevers 15 toward the hot side of the engine. The means by which the biasing force is provided and the reciprocating motion of the cantilevers is utilized to perform useful work will be subsequently understood after referring to the description and drawings following hereinafter.

Figure 5:
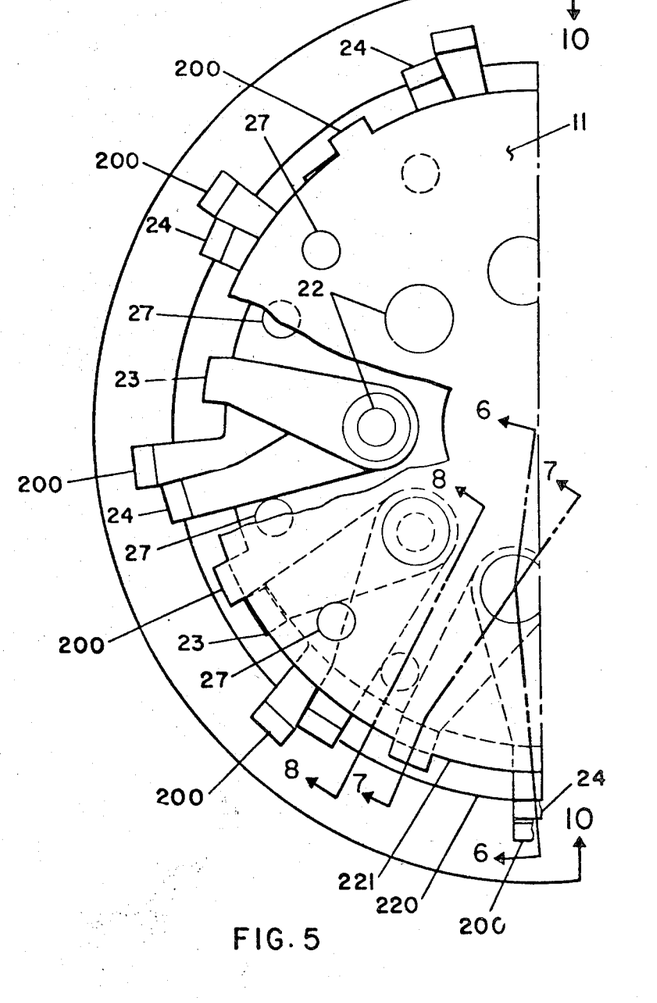
FIG. 5 is a view of the center spindle and associated parts taken substantially through a plane indicated by section-line 5—5 of FIG. 3.
Figure 6:
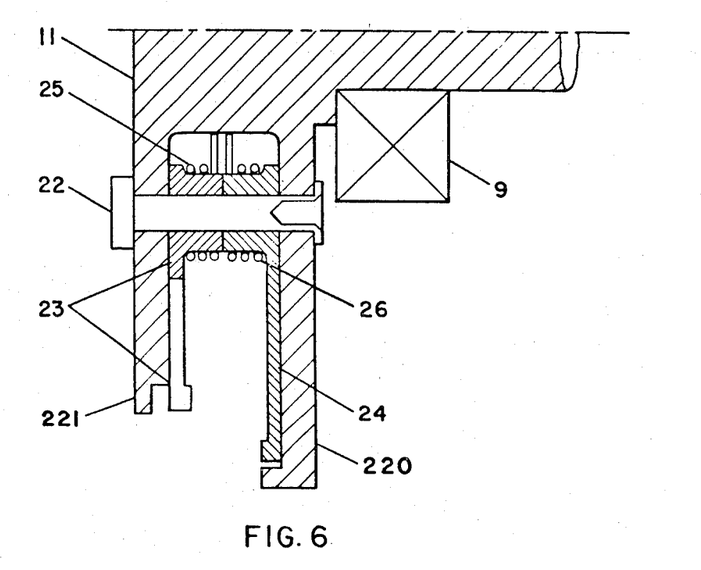
FIGS. 6, 7 and 8 are section views through portions of the center spindle substantially along section-lines 6—6, 7—7, and 8—8 respectively, of FIG. 5.
Figure 7:
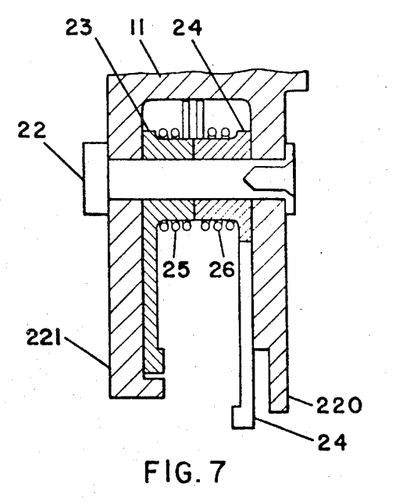
Figure 8:
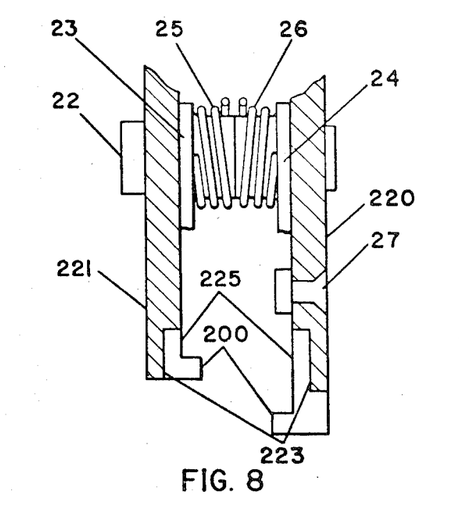
Figure 9:
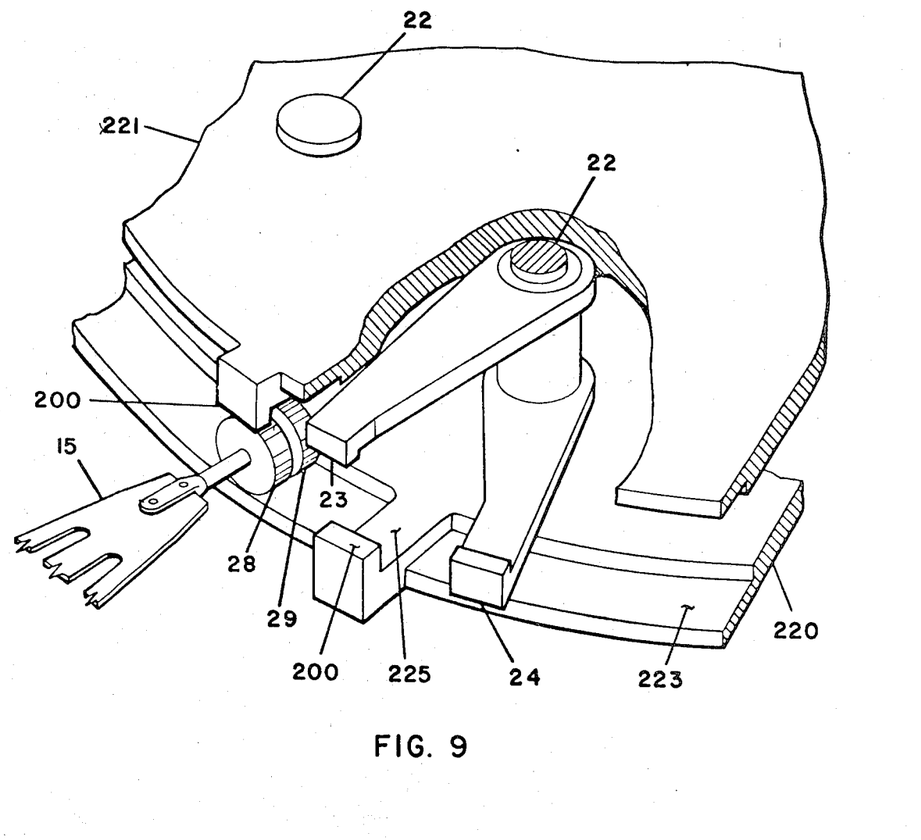
FIG. 9 is a perspective view of a portion of the center spindle and other parts associated with FIG. 5.

FIG. 5 is a partial view of spindle 11 and its associated parts as viewed from the hot-side of the engine from a plane indicated by line 5—5 in FIG. 3. A portion of the spindle 11 has been broken away to more clearly show the internal construction, and certain hidden parts have been shown with dash lines so that the operation of these parts may be more clearly understood. FIGS. 6, 7 and 8 are sectional views through the spindle along the section lines 6—6, 7—7 and 8—8 of FIG. 5, and FIG. 9 is a perspective view of a portion of spindle 11 and its associated parts which are shown in plan view in FIG. 5. Mounted through and interconnecting the hot-side flange 221 and cold-side flange 220 of spindle 11 are a plurality of pivot pins 22 which journal hot-side latches 23 and cold-side latches 24 between the spindle flanges 220 and 221. These latches are so mounted that they are free to rotate about their respective pivot pins 22, it being appreciated that proper lubrication facilities and dimensional control being provided in order to accommodate relative rotation of the latches 23 and 24 around pivot pins 22 with minimum frictional losses. Latches 24 are biased by torsional springs 26 to rest against stops 27 in the cold-side flange 220, and in a like manner torsional springs 25 bias latches 23 against stops 27 mounted in the hot-side flange 221.

It will be most clearly observed in FIG. 9 that the hot-side flange 221 of spindle 11 is shaped along its periphery to form a continuous land-and-groove cam surface comprising a circumferential groove 223 interrupted periodically by a rectangular land 225 projecting radially from the innermost surface of the groove to beyond the nominal circumference of the flange 221 and terminating in a rectangular lobe 200. The cold-side flange 220 is likewise shaped along its periphery. FIG. 8 is a sectional view which illustrates, in composite, the grooves 223, lands 225, and lobes 200, of both flanges 220 and 221.

It will be further observed in FIGS. 9 and 5 that the hot-side latches 23 and cold-side latches 24 are shaped at their outermost ends to be the same width as the lands 225 of the flanges, and, in cross section, the latches 23 and 24 terminate with lobes which are coplanar, with the flange lobes 200, best shown in FIGS. 6 and 7. For clarity, in FIG. 5 one of the cold-side latches 24 has been rotated away from stop 27 into alignment with lobe 200 and sectioned by line 6—6 to produce FIG. 6, and in a like manner one of the hot-side latches 23 has been rotated into alignment with a cold-side lobe 200 and sectioned by line 7—7, all other latches 23 and 24 being illustrated by FIG. 5 in their biased-position against their respective stops 27.

Figures 10, 11, 12:
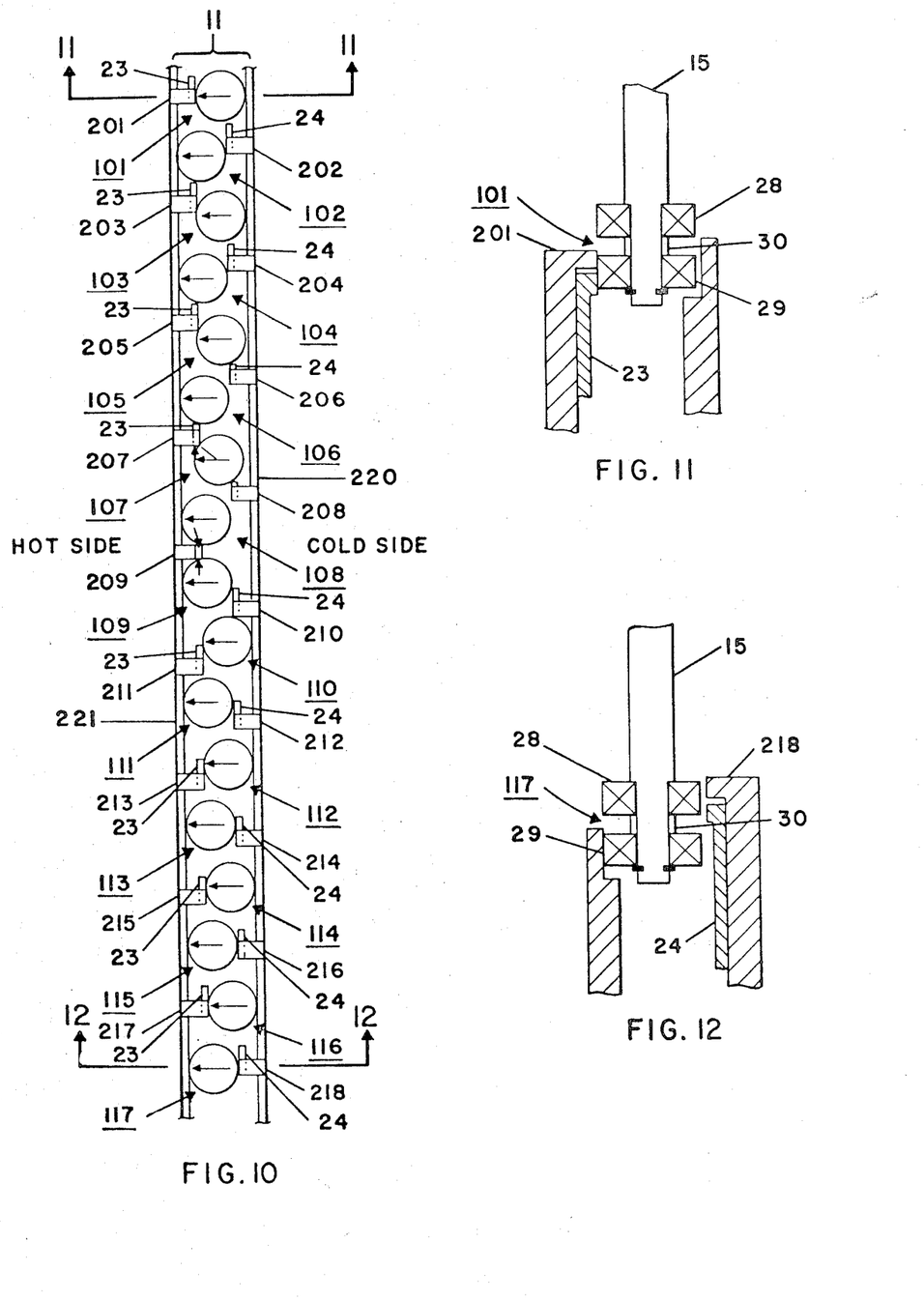
FIG. 10 is a circumferential view of the center spindle cam surfaces and cam followers, laid out in flat pattern, taken substantially from a plane indicated by line 10—10 of FIG. 5.
FIGS. 11 and 12 are sectional views taken substantially through planes indicated by section-lines 11—11 and 12—12 respectively, of FIG. 10.

Rotatably mounted to each cantilever 15 at the innermost end, in the area of spindle 11, are two rollers 28 and 29 disposed apart by spacer 30 as shown in FIGS. 9, 3 and 11. These rollers 28 and 29 are sized and located in such a manner that the innermost roller 29 comes into rolling contact with the cam surface, comprising lands 225 and grooves 223, of hot-side flange 221, and the outermost roller 28 comes into rolling contact with the similar cam surface of cold-side flange 220 as the cantilever 15 reciprocates from the hot side to the cold side of the engine.

FIG. 10 is a flat-pattern diagrammatic view looking inward towards the engine center from a plane substantially along line 10—10 of FIG. 5. Each set of rollers 28 and 29 comprise a cam follower assembly, 101 through 117, there being a total of seventeen followers. The cold-side flange 220 comprises nine lobes, evenly numbered 202 through 218, located on its cam surface, and the hot-side flange 221 comprises nine lobes, oddly numbered 201 through 217. It will be appreciated that while many variations in the number of lobes and followers may be devised, in the embodiment illustrated by way of example only, the total number of lobes is 18 and the total number of followers is 17 the only requirement being that there be at least one more total number of lobes than followers.

In FIG. 10 the engine is cooled and in a stopped position wherein all followers, 101 through 117 are biased towards the hot-side flange 221 by their respective cantilevers 15, as illustrated by small arrows within each follower. Followers 103, 105, and 107 are stalled such that the bias force of their respective cantilevers 15 produce a static force in the vertical direction on their respective lobes 203, 205, and 207, as illustrated by the small vertical arrow within follower 207, which is forcing spindle 11 to rotate in an upward direction relative to the followers. Follower 108 is stalled hard against the groove portion of hot-side flange 221 and is preventing upward movement of the spindle 11 because of its contact with lobe 209. In a like manner follower 109 is preventing downward movement of the spindle 11 because of its contact with lobe 209. Thus, it can be seen that while cantilever biasing forces are loading the spindle 11 to rotate in an upward direction, the spindle is prevented from moving in either an upward or downward direction by the forces acting on lobe 209 by followers 108 and 109.

To start the engine, heat is applied to the hot side of the engine, and when sufficient heat has been transferred to cantilevers 15 by heat sinks 17, rotation of spindle 11 will begin. The cantilevers 15 associated with followers evenly numbered 102 through 108 and oddly numbered 109 through 117 are at rest in direct contact with their respective heat sinks 17, and as heat is stored and transferred by the heat sinks to the cantilevers the increasing temperature raises the internal stresses within the cantilevers until sufficient force is built up to overcome the hot-side spring bias of the cantilevers and they commence to travel toward the cold side. As follower 108 starts traveling toward the cold-side flange 220 it unlocks the spindle 11, permitting the static stressed followers 103, 105 and 107 to start rotating the spindle 11 in an upward direction.

Figures 13, 14, 15, 16, 17:
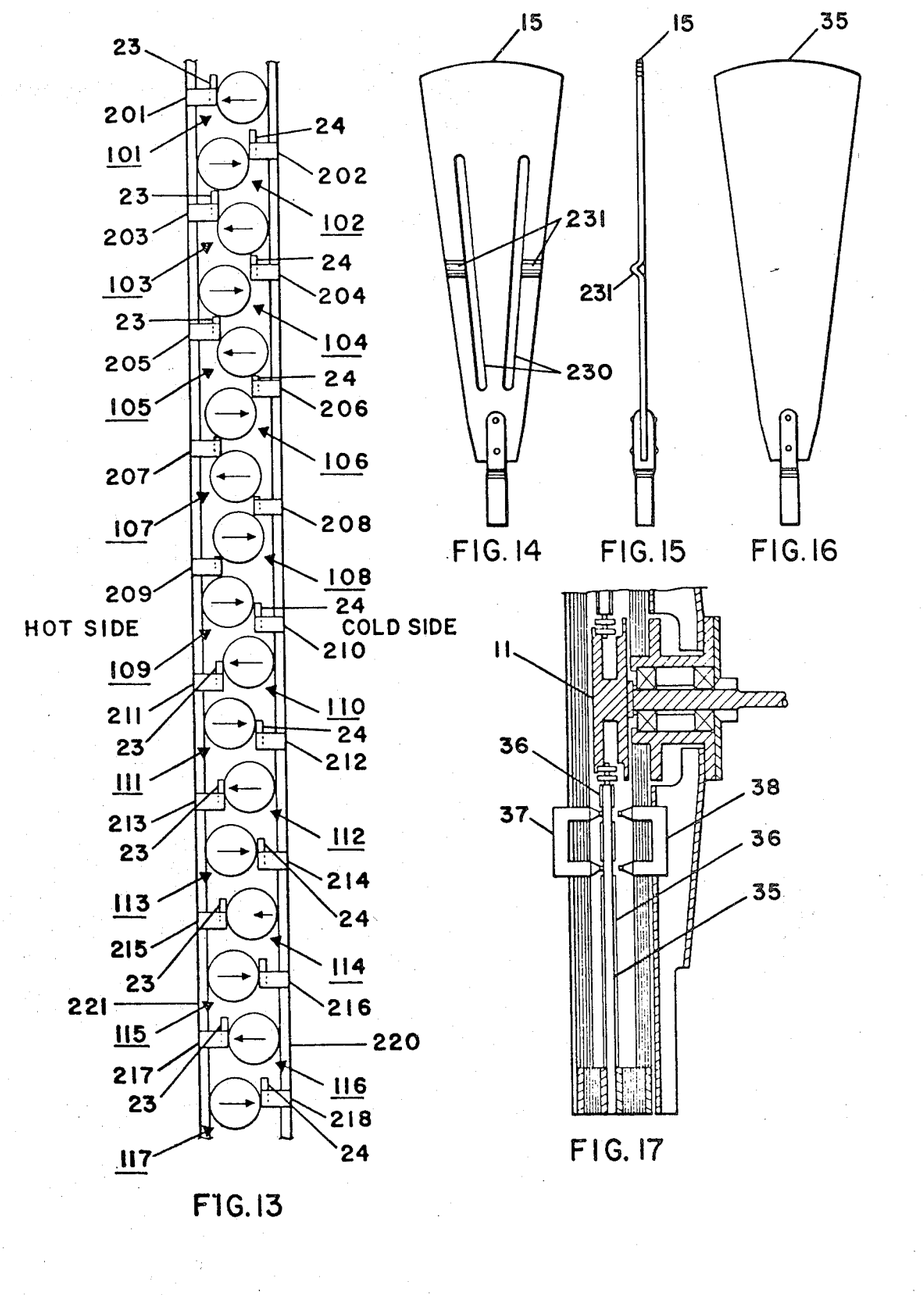
FIG. 13 is a simplified flat pattern view similar to FIG. 10 with the cam followers disposed in a differing pattern.
FIGS. 14 through 16 illustrate cantilevers utilized as the driving elements of the engine.
FIG. 17 illustrates an alternate embodiment of the engine heat sinks and cantilevers.

FIG. 13 illustrates the engine in a running state immediately after start-up from the stopped condition illustrated in FIG. 10. The cantilevers of followers 102, 104, 106 and 108 have heated sufficiently to overcome their hot-side biasing and are stroking toward the cold-side flange 220, and due to their contacting the lower edge of their respective lobes 202, 204, 206 and 208, the followers are exerting upward forces on the lobes, causing the spindle 11 to rotate in an upward direction relative to the followers. Because of the progressive increase in displacement of these followers from their respective lobe edges, progressing from top to bottom, the upward force exerted by the followers on the lobes like-wise progressively increases such that it is greatest on lobe 208 and at least on lobe 202.

Followers oddly numbered 109 through 117 are prevented from stroking by their respective latches 24 and lobes. This latching action holds the cantilevers 15 into contact with their respective heat sinks 17 for a sufficient length of time to assure storage of an adequate amount of heat energy, so that the cantilevers perform work on the spindle 11 as they travel from the hot-side flange 221 to the cold-side flange 220. In a like manner the latches 23, and lobes of hot-side flange 221 are latching the cantilevers of followers evenly numbered 110 throgh 116 against their cold-side heat sinks 18 to assure adequate cooling and reversal of thermal stresses, thereby causing the hot-side bias force to stroke these followers toward the hot-side flange 221 after they are unlatched. In FIG. 13 it will be observed that the latch 24 associated with lobe 202 is in its static position against its stop 27, (FIG. 8) because of the light spring load action of torsion spring 26. At lobes 204 and 206 the latch 24 is being progressively rotated downward toward these lobes, and at lobe 208 the latch is in complete alignment with lobe 208. Thus, while the cold-side latches 24 prevent followers stroking from the hot side to the cold side, they offer little resistance to cam followers stroking from the cold side to the hot side. In a like manner hot-side latches 23 act only to block cam follower travel from cold side to hot side.

From the foregoing it can be seen that at the instant of time illustrated in FIG. 13, followers 102 through 108 are performing work by exerting upward forces on their respective lobes 202 through 207 causing rotation of spindle 11. Followers 109 through 117 and follower 101 are all latched and are in progressively advancing stages of heating or cooling. This action is continuous, and the cantilevers stroke from hot to cold and cold to hot sides in a rolling action, producing a constant rotation of the engine spindle 11. When all 17 followers have executed one unidirectional stroke the spindle experiences one-eighteenth of a revolution. The number of followers and lobes is for illustration purposes only, and it should be appreciated that the more of these parts that are provided, the smoother will be the output torque and the greater will be the amount of energy conversion.

The construction and operation of the engine will be apparent from the foregoing description, and it will be appreciated that the cantilevers will undergo cyclic expansion and contraction due to a programmed heating and cooling cycle so that their respective followers reciprocate and alternately contact the hot-side cam surface and the cold-side cam surface of the engine spindle 11 thereby causing relative rotation of the spindle. Each cantilever will make nine hot-to-cold and nine cold-to-hot cycles per spindle revolution, for a total of 306 follower cycles per engine revolution. It will also be apparent that the embodiment illustrated is for example only, and that many other arrangements may be devised to tailor the engine performance to a desired requirement. For example, to name only a few; the force and distance of the cantilever power stroke may be varied by altering the size, shape, thickness, number and type of laminates, and amount of hot-side biasing of the cantilever: The edges of lobes 201 through 218 may be rounded or contoured to fit the dynamics of the engine; thermal response time may be varied by altering the size, shape, mass, and location of the heat sinks, 17 and 18 along with changes in thermal coatings to obtain the desired heat energy absorptance and emittance values if the heating and cooling of the heat sinks is accomplished by radiation rather than conduction: cantilever heating and cooling time intervals may be varied by altering the geometry of the hot-side and cold-side latches 23 and 24, and utilizing additional latching bias means as will be hereinafter described.

FIGS. 14 and 15 illustrate one of the cantilevers 15 which is of a well known construction wherein two or more different materials are secured to each other so that contraction or expansion of one or more of the materials at a greater rate than the other will cause the cantilever to bend or deflect. The significant characteristic of bimetal is that it deflects proportionally with temperature change, and it developes a force when deflection is inhibited. A bimetal member therefore can produce both force and deflection and thereby perform mechanical work. In the present invention it is necessary to store sufficient heat energy in the form of stress in the cantilever 15 to perform mechanical work on the spindle 11 as the cantilever travels from the hot-side flange 221 to theco cold-side flange 220 and thereafter during the return travel from the cold side to the hot side. It will be noted that a slot 230 has been disposed along each of the two longest edges of cantilever 15 and that a joggle 231 has been formed in the narrow remaining edge portion of cantilever 15. These two joggled edge portions act as springs which give a snap-action to the cantilever on an over-center toggle principle. Thus, when the cantilever has been sufficiently heated it will snap away from the hot side and travel to the cold side with sufficient spring force to perform the desired work, and upon cooling the spring action will reverse over center and snap the cantilever away from the cold side towards the hot side.

Another technique for performing this toggle action is illustrated in FIGS. 16 and 17 wherein flat cantilever 35 is made of magnetic materials, and the hot-side heat sinks 37 and cold-side heat sinks 38, being made of a permanently magnetized material, are horseshoe shaped to present a north and south pole to the cantilever 35. Insulation laminate 36 contains corresponding apertures to allow intimate contact of tips of heat sinks 37 and 38 with the cantilever. The cantilever 35 is so shaped that in the cool state it is prestressed to have a residual spring bias towards the hot side. When the temperature has raised sufficiently to cause the thermal stress forces to be greater than the hot-side spring bias and magnetic attraction of heat sink 37, the cantilever will break away and move toward the cold-side heat sink 38, where after cooling the hot-side spring bias builds up sufficiently to overcome the magnetic attraction of heat sink 38 and the cantilever breaks away and moves towards the hot side. Clearly these two techniques may be combined wherein cantilever 15 is made of magnetic materials and heat sinks 17 and 18 are constructed of magnetized materials coaxially constructed so that the single contact point of each heat sink presents a north and sourth pole to cantilever 15.

Other modifications, ramifications, arrangements, and applications of the invention will become apparent to those skilled in the art upon reading the present disclosure, and these are intended to be included within the scope of this invention, it being understood that the preceding description is by way of example only and is not to be taken as a limitation, the spirit and scope of this invention being limited only the appended claims.

I claim:

1. A thermally actuated engine comprising a plurality of bimetallic elements, thermally expansive and contractive in response to addition or subtraction of heat energy, a continuously rotatable driven member, a plurality of rollers, wherein at least one roller is rotatably mounted to each of said bimetallic elements and in rolling contact with the driven member, said driven member having a contoured outer portion on which said rollers move during contraction and expansion of the bimetallic elements, and rotational mounting means in which said driven member rotates in response to movement of said rollers on said contoured outer portion of the driven member.

2. The combination of claim 1 wherein said bimetallic elements are supported as cantilevers within a housing, said housing forming at least two heat exchange zones in proximity to said elements.

3. The combination of claim 2 wherein said heat exchange zones comprise a first and second plurality of heat sinks spaced in close proximity to said bimetallic elements to form a chamber within which the bimetallic elements deflect in response to heat supplied by said first plurality of heat sinks and to heat extracted by said second plurality of heat sinks.

4. A thermally actuated engine comprising a plurality of bimetallic elements, each element having a fixed end and a free end, each of said elements supported as a cantilever at the fixed end, each of said elements rotatably supporting at least one roller at the free end, a driven member having at least one cam surface comprising a plurality of lobes disposed along a flat surface in a repetitive pattern, said cam surface in working contact with said roller whereby the driven member is rotated by movement of said roller imposed on said lobes.

5. The combination of claim 4 wherein said bimetallic elements are truncated circular segments disposed to form a substantially circular plane, said fixed ends forming the circumference of the circular plane and said free ends comprising the truncated vertex of said segments.

6. The combination of claim 4 further comprising a plurality of latches rotatably mounted on said driven member in working proximity to at least one of said lobes, each of said latches having an end shaped substantially as one of said lobes, said end capable of rotating substantially concentric to one of said lobes, a means to rotationally bias said latch end away from said lobe, a stop mounted on said driven member whereby said latch is held in a stable position relative to said driven member.

7. A thermally actuated engine comprising a plurality of bimetallic cantilevers, each having a truncated circular segment plan form, said cantilevers disposed to form a substantially circular plane;
   a housing surrounding said cantilevers, said housing forming a first and second heat exchange zone, said first zone comprising at least one heat sink to heat said cantilevers, said second zone comprising at least one heat sink to cool said cantilevers, said housing fixedly securing the base of each of said circular segment planform cantilevers so as to position the cantilevers substantially midway between said first and second heat exchange zones while permitting said cantilevers to reciprocate by bending toward and away from each of said heat exchange zones;
   at least one roller rotationally secured to the truncated end of each circular segment cantilever;
   a spindle rotationally mounted within the housing in concentric relationship to said cantilevers, said spindle comprising a pair of flanges spaced apart to form a chamber through which said rollers pass, said chamber having contoured portions which produce rotation of said spindle in response to movement of said rollers by the cyclic thermal expansion and contraction of said cantilevers;
   a plurality of latches rotationally mounted to said spindle, each of said latches contacting said rollers during a portion of the spindle rotation to intermittently hold said cantilevers against one of said heat sinks; and
   insulation means disposed around the plurality of cantilevers to substantially bias all cantilever heat flow to and from said heat sinks.

8. The combination of claim 7 wherein said cantilevers are spring biased toward one of said heat zones.

9. The combination of claim 7 wherein said cantilevers comprise ferromagnetic material and said heat sinks are magnetized.

10. The combination of claim 9 wherein further said cantilevers are spring biased toward one of said heat zones.

11. An engine comprising a plurality of drive members each having a fixed end and a free end, said free end flexibly movable from a first position to a second position when heat is applied to said drive member and from said second position to said first position when heat is removed from said drive member; a roller means mounted on the free end of each of said drive members;

means to sequentially apply heat and remove heat from said drive member to flex said drive member free end in a reciprocating motion between said first and second position;

driven means including a rotatable spindle operatively engaging said roller means during a portion of the reciprocating motion of said drive member free end, said roller means mechanically urging said driven means to rotate during operative engagement of roller means with said driven means; and sequencing means comprising a plurality of latches positioned to interrupt the drive member free end reciprocating motion during a portion of said spindle rotation, and a latch biasing means operatively engaging each of said latches for interrupting said drive member motion during only one direction of the reciprocating motion.

* * * * *